UNITED STATES PATENT OFFICE.

LUDWIG OTTO HELMERS, OF HAMBURG, GERMANY, ASSIGNOR TO THE ICHTHYOL GESELLSCHAFT, CORDES, HERMANNI & CO., OF SAME PLACE.

MEDICINAL COMPOUND AND PROCESS OF MAKING SAME.

SPECIFICATION forming part of Letters Patent No. 649,305, dated May 8, 1900.

Application filed July 21, 1899. Serial No. 724,714. (No specimens.)

*To all whom it may concern:*

Be it known that I, LUDWIG OTTO HELMERS, a subject of the German Emperor, residing at Hamburg, in the German Empire, have invented certain new and useful Preparations of Albumin and Sulfonized Carbon Compounds and Process of Making Same, of which the following is a specification.

Albumin solutions are not precipitated by the salts of ichthyolsulphonic acid from a sufficiently-diluted solution, even when the said solution is heated to boiling-point. Like the ichthyol salts in the presence of albumin also behave other substances which are obtained by the action of sulfuric acid on mineral oils and similar hydrocarbons containing sulfur—viz., the so-called "petrosulfol," (see *Wiener Klinische Rundschau*, No. 20, 1898,) thiol, (see German Patent No. 38,416,) and the like. According to the German Patent No. 100,707 precipitations from these solutions take place only in the presence of a stronger acid, respectively, by employing free sulfonic acids. Experiments, however, have shown that such precipitations containing albumin can also be obtained by an addition of sufficient quantities of salt to the watery solutions of albumin and the aforesaid substances. The precipitations obtained at ordinary temperature by the alkali salts are in contrast to the substances obtained by the German Patent No. 100,707 soluble in pure water. They become insoluble by drying and heating for a somewhat longer time with a salt solution in excess. These products, insoluble in water, can be obtained directly by producing the precipitation at a higher temperature. Some salts, such as sodium phosphate, precipitate solutions of albumin and the said sulfur-containing substances only by heating. When treating such albumin solutions with salts of the earth alkalies or with salts of metals, it will not be necessary to heat the solution, since precipitations insoluble in water take place at ordinary temperature, so that they need only be washed out and dried. The substances thus obtained in one or the other way by precipitation with salts contain, besides the sulfonic acids and albumin, also the base of the salt utilized, and therein are different from those described in the German Patent No. 100,707. These new chemical compounds are precipitated in the form of slimy products containing water, which after drying at about 100° centigrade are easily pulverizable and are of a brown color without smell or taste, insoluble in water, and nearly insoluble in the usual organic solvents. By heating them with acids they split off the base, and thus become converted into the products of the German Patent No. 100,707. When being heated with alkali, they swell and gradually become completely dissolved.

The following is given as an example of the process:

(a) One kilogram of petrosulfol is dissolved in three liters of water and then added to a solution of one kilogram of albumin in ten liters of water. This mixture is precipitated by gradually stirring it with twenty kilograms of a ten-per-cent. ammonium-chlorid solution. After the precipitation is completed the liquor containing albumin and ammonium chlorid is poured off, and to the precipitated residue is added a solution of ammonium chlorid, which is then heated for several hours, and afterward the insoluble precipitation is pressed and washed in hot water and finally dried at about 100° and pulverized.

(b) To the solution of one kilogram of thiol in twenty liters of water is mixed one kilogram of albumin in ten liters of water, and the mixture is then heated for some time over a water-bath by adding twenty kilograms of a twenty-five-per-cent. common-salt solution. The liquor is then poured off and the precipitation is repeatedly washed with water, pressed, and dried.

(c) The solutions of one kilogram of ichthyol ammonium in fifteen liters of water and one kilogram of albumin in ten liters of water are precipitated with three kilograms of a ten-per-cent. calcium-chlorid solution. The precipitation is freed of its liquor by pressing and afterward washed with water and dried.

Having fully described my invention, what I claim, and desire to secure by Letters Patent, is—

1. The process which consists in treating an aqueous solution of a mixture of albumin and a product derived from a sulfureted hydrocarbon combined with sulfuric acid, with a solution of a suitable salt, whereby an insoluble compound is formed and precipitated, substantially as set forth.

2. A compound in the form of a brown powder, consisting of albumin, a base, and a product derived from a sulfureted hydrocarbon combined with sulfuric acid, said compound being insoluble in water and other solvents and tasteless as well as odorless, substantially as set forth.

LUDWIG OTTO HELMERS.

Witnesses:
ALEXANDER SPECHT,
E. H. L. MUMMENHOFF.